(12) United States Patent
Choi-Grogan et al.

(10) Patent No.: US 8,515,412 B2
(45) Date of Patent: Aug. 20, 2013

(54) METHOD AND APPARATUS FOR MAINTAINING USER SETTINGS FOR OVER-THE-AIR UPGRADES

(75) Inventors: Yung Choi-Grogan, Issaquah, WA (US); Jun Shen, Redmond, WA (US); Ming Zhang, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 365 days.

(21) Appl. No.: 12/626,076

(22) Filed: Nov. 25, 2009

(65) Prior Publication Data
US 2011/0124325 A1 May 26, 2011

(51) Int. Cl.
*H04M 3/00* (2006.01)
*H04M 11/10* (2006.01)

(52) U.S. Cl.
USPC .......................................... 455/419; 455/413

(58) Field of Classification Search
USPC .... 455/418–420, 412.2, 423–425, 41.2–41.3, 455/550.1, 436–448
See application file for complete search history.

(56) References Cited

U.S. PATENT DOCUMENTS

| | | | |
|---|---|---|---|
| 6,615,038 B1* | 9/2003 | Moles et al. | 455/418 |
| 7,206,384 B2* | 4/2007 | Beyda | 379/9.01 |
| 7,295,844 B1* | 11/2007 | Moon et al. | 455/445 |
| 2001/0029178 A1* | 10/2001 | Criss et al. | 455/419 |
| 2004/0203367 A1* | 10/2004 | Nowlin | 455/41.2 |
| 2005/0229171 A1* | 10/2005 | Henry et al. | 717/168 |
| 2007/0105538 A1* | 5/2007 | Hassan et al. | 455/418 |
| 2008/0287133 A1* | 11/2008 | Park et al. | 455/442 |
| 2010/0279663 A1* | 11/2010 | Wang et al. | 455/413 |

* cited by examiner

*Primary Examiner* — Brandon Miller

(57) ABSTRACT

A method and apparatus for performing a software upgrade are disclosed. The method determines a plurality of mobile endpoint devices affected by a wireless network access software upgrade, and schedules a deployment of the wireless network access software upgrade. The method transmits a notification to the plurality of mobile endpoint devices, wherein the notification is configured to cause each of the plurality of mobile endpoint devices to store user settings in a memory of each of the plurality of mobile endpoint devices. The method downloads the wireless network access software upgrade wirelessly to the plurality of mobile endpoint devices, wherein the wireless network access software upgrade is configured to cause each of the plurality of mobile endpoint devices to install the wireless network access software upgrade and to restore the user settings from the memory of each of the plurality of mobile endpoint devices.

19 Claims, 5 Drawing Sheets

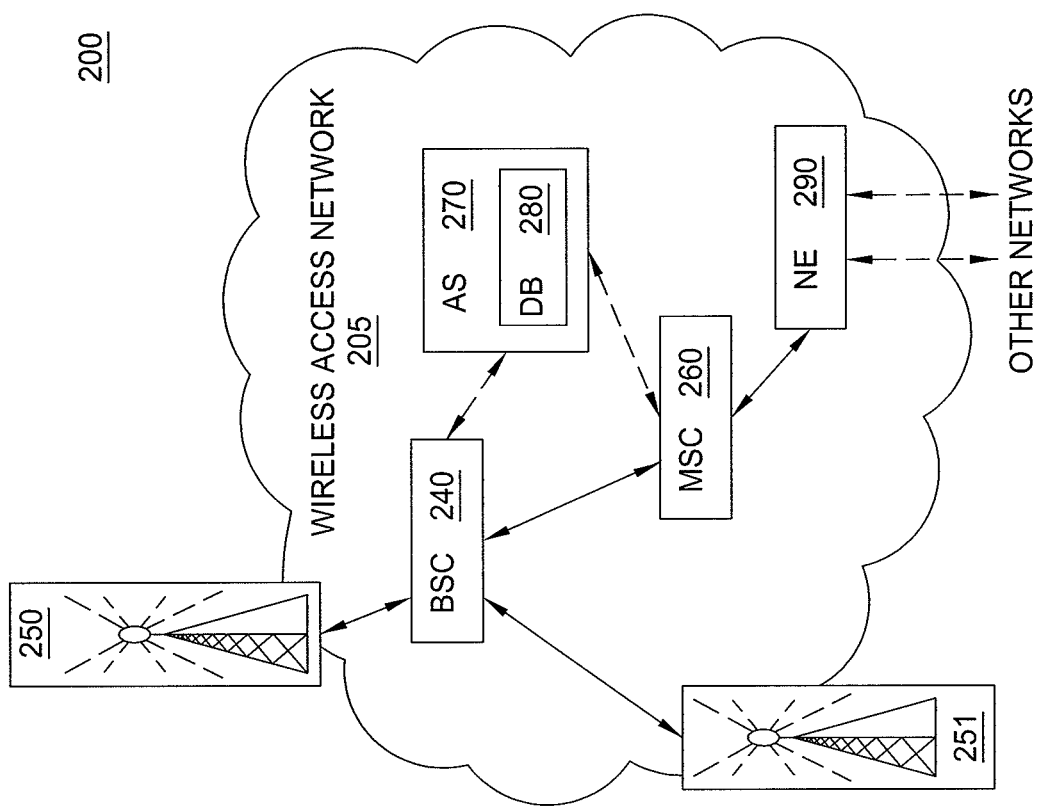
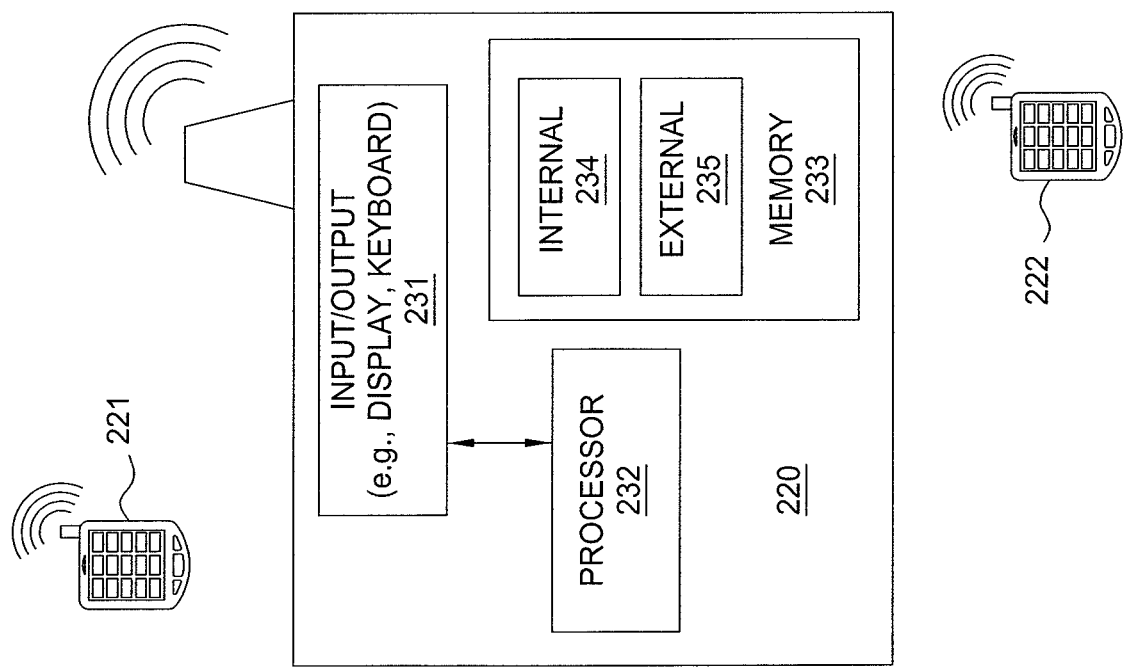
FIG. 2

METHOD AND APPARATUS FOR MAINTAINING USER SETTINGS FOR OVER-THE-AIR UPGRADES

The present disclosure relates generally to wireless communication networks and, more particularly, to a method and apparatus for preserving and maintaining user settings during over-the-air upgrades of wireless network access software of mobile endpoint devices, e.g., cellular phones, mobile phones, smart phones and the like.

BACKGROUND

Wireless network operators may use Over-the-Air (OTA) procedures to deploy major wireless network access software and/or firmware upgrades to mobile endpoint devices (e.g., cellular phones, mobile phones, smart phones, and the like). However, since such OTA upgrades affect the software/firmware operating at the lowest levels of the network architecture (e.g., Open System Interconnection (OSI) Reference Model levels 1-3), such OTA upgrades often cause the target device to lose all user settings, causing inconvenience and frustration to affected subscribers/users. Consequently, network operators have not widely used OTA procedures to deploy major wireless network access software and/or firmware upgrades to mobile endpoint devices.

SUMMARY

In one embodiment, a method and apparatus for performing a software upgrade are disclosed. For example, the method determines a plurality of mobile endpoint devices affected by a wireless network access software upgrade, and schedules a deployment of the wireless network access software upgrade to the plurality of mobile endpoint devices in accordance with a schedule. The method transmits a notification of the deployment of the wireless network access software upgrade to the plurality of mobile endpoint devices, wherein the notification is configured to cause each of the plurality of mobile endpoint devices to store user settings in a memory of each of the plurality of mobile endpoint devices. The method downloads the wireless network access software upgrade wirelessly to the plurality of mobile endpoint devices for installation by the plurality of mobile endpoint devices, wherein the wireless network access software upgrade is configured to cause each of the plurality of mobile endpoint devices to install the wireless network access software upgrade and to restore the user settings from the memory of each of the plurality of mobile endpoint devices.

BRIEF DESCRIPTION OF THE DRAWINGS

The teaching of the present disclosure can be readily understood by considering the following detailed description in conjunction with the accompanying drawings, in which:

FIG. 2 illustrates an exemplary wireless access network related to the present disclosure;

To facilitate understanding, identical reference numerals have been used, where possible, to designate identical elements that are common to the figures.

DETAILED DESCRIPTION

The present disclosure broadly discloses a method and apparatus for maintaining mobile endpoint device user settings during Over-the-Air network wireless access software/firmware upgrades. For ease of reference, the term software, as used throughout the disclosure, is intended to include both software and firmware. Although the present disclosure is discussed below in the context of a wireless access network and a packet network, e.g., an Internet Protocol (IP) Multimedia Subsystem (IMS) network, the present disclosure is not so limited. Namely, the present method and apparatus can be applied to any packet switched or circuit switched networks.

Figure 1:
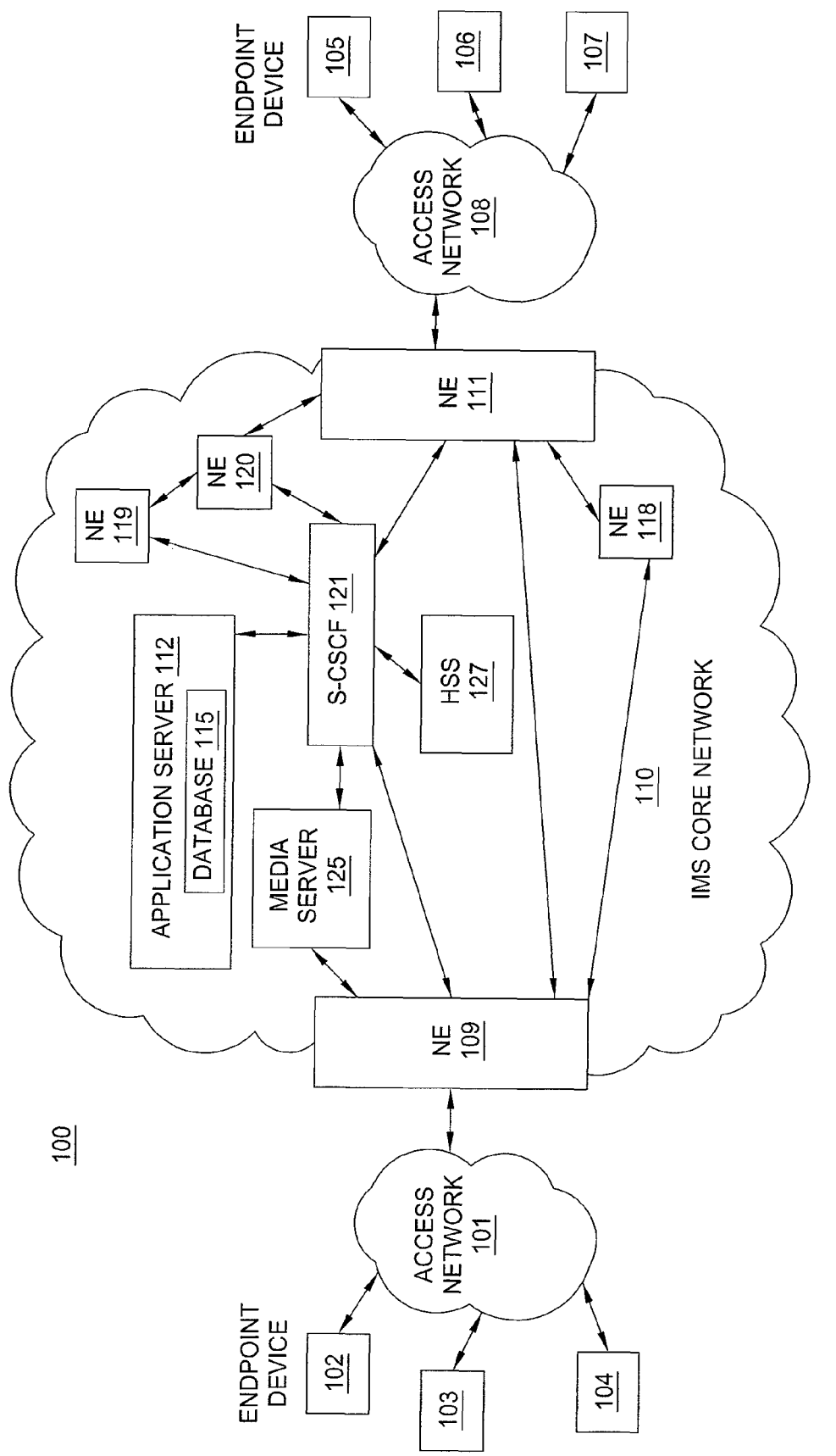
FIG. 1 illustrates an exemplary network related to the present disclosure.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, IP phones, Personal Digital Assistants (PDAs), cellular phones, mobile phones, smart phones, email devices, messaging devices, and the like. The access networks 101 and 108 serve as a means to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a cellular network, a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving-Call Session Control Function (S-CSCF) 121, a media server 125, and an Application Server 112 that contains a database 115. A HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g. VoIP services). The S-CSCF interacts with the appropriate service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers). For example, the S-CSCF may need to interact with another server for translation of an E.164 voice network address into an IP address, and so on.

The Media Server (MS) 125 is a special server that typically handles and terminates media streams to provide services such as announcements, bridges, and Interactive Voice Response (IVR) messages for VoIP service applications. The media server also interacts with customers for media session management to accomplish tasks such as process requests.

The application server 112 may comprise any server or computer that is well known in the art, and the database 115 may be any type of electronic collection of data that is also well known in the art. In one embodiment, the application server 112 is configured to deploy Over-the-Air (OTA) wireless network access software upgrades to mobile endpoint devices, as described below. Those skilled in the art will realize that the communication system 100 may be expanded by including additional endpoint devices, access networks, network elements, application servers, etc. without altering the scope of the present disclosure.

The above IP network is described only to provide an illustrative environment in which packets for voice, data and multimedia services are transmitted on networks. The current disclosure discloses a method and apparatus for maintaining mobile endpoint device user settings during Over-the-Air wireless network access software upgrades in an exemplary communication network (e.g., an IMS network) illustrated in FIG. 1 and as described below.

FIG. 2 illustrates an exemplary access network 200 suitable for implementing embodiments of the present method and apparatus for maintaining mobile endpoint device user settings during Over-the-Air wireless network access software upgrades. For example, access network 200 comprises a wireless access network 205. Access networks 101 and 108 depicted in FIG. 1 may comprise, for example, a wireless access network, such as wireless access network 205. Wireless access network 205 is configured to facilitate communication between the mobile endpoint devices 220-222 (e.g., cellular phones, mobile phones, smart phones, and the like) with other endpoint devices (not shown in FIG. 2) via other networks, such as the core IMS network 110. The link between the mobile endpoint devices 220-220 and the wireless access network 205 comprises RF signals between the one or more base stations 250-251 and the wireless endpoint devices 220-222. Here only two base stations 250 and 251 are depicted. However, it should be appreciated that the wireless access network 205 may comprise any number of base stations depending upon the size and needs of the network. In addition, although only three mobile endpoint devices 220-222 are depicted, it should be appreciated that any number of mobile endpoint devices may be serviced at the same time by the wireless access network 205.

To manage the communications of multiple users serviced by the wireless access network 205, the wireless access network 205 may comprise one or more network elements. For example, the wireless access network 205 may comprise one or more base station controllers (BSCs) for managing RF communication of the base stations 250-251. Although only one BSC 240 is depicted in FIG. 2 it should be understood that any number of BSCs can be deployed. For example, each base station 250-251 could be serviced by its own BSC. BSC 240 performs a variety of wireless network management related tasks such as wireless channel assignments, determining transmission power levels, and controlling handovers from one base station to another base station, and the like.

In one embodiment, wireless access network 205 includes at least one mobile switching center (MSC) 260. Among other functions, the MSC 260 may maintain user profile records for users currently serviced by the base stations within the portion of the wireless access network that is the responsibility of MSC 260. For example, the MSC provides the information that is needed to support mobile service subscribers, such as user registration and authentication information. The MSC may also function as a media gateway and/or media gateway controller facilitating communication between the wireless access network 205 and other networks. For example, in a typical circuit-switched wireless communication systems, the MSC may connect the landline public switched telephone network (PSTN) system to the wireless communication system. Thus, the MSC 260 may be responsible for connecting calls from mobile endpoint devices 220-222 to other wireless users or to users on other networks such as the PSTN, VoIP networks, asynchronous transfer mode (ATM) or frame relay networks, etc via a network element 290.

In one embodiment, the wireless access network 205 may also include an application server 270, which may include a database 280. The application server 270 may be configured to provide one or more functions supporting calls via the wireless access network 205. For example, application server 270 may comprise any server or computer that is well known in the art, and the database 280 may be any type of electronic collection of data that is also well known in the art. In one embodiment, the application server 270 is configured to deploy Over-the-Air (OTA) wireless network access software upgrades to mobile endpoint devices, such as mobile endpoint devices 220-222.

Although the network elements comprising the wireless access network 205 have been described as one or more discrete devices, it should be appreciated that the functionality described with respect to each network element is not limited to the particular device as described and depicted herein. Rather, the embodiment of FIG. 2 is merely illustrative of one wireless access network configuration that is suitable for implementing embodiments of the present disclosure. Thus, any other network elements providing the same functionality described herein with respect to the wireless access network 205 would be equally suitable for use in accordance with embodiments of the present disclosure. In addition, it should be noted that the wireless access network 205 may be expanded by including additional endpoint devices, base stations, BSCs, MSCs, network elements, application servers, etc. without altering the scope of the present disclosure.

The wireless access network 205 is described to provide an illustrative environment in which packets and signals for voice, data and multimedia services are transmitted. The current disclosure discloses a method and apparatus for maintaining mobile endpoint device user settings during Over-the-Air wireless network access software upgrades in an exemplary communication network such as the IMS network illustrated in FIG. 1 and/or the wireless access network 205 as illustrated in FIG. 2. In other words, the wireless network access software upgrades can be initiated by an application server 270 residing in the wireless access network 205 or by an application server 112 residing in a core network 110.

FIG. 2 also depicts a more detailed view of an exemplary mobile endpoint device. In particular, mobile endpoint device 220 may comprise a cellular phone, a mobile phone, a smart phone, and the like, and broadly includes a processor 232, various input and output devices 231 (such as a display, a keyboard, a speaker, a microphone, a touch screen, a transceiver, and so on) and a memory 233 including both internal memory 234, such as RAM, ROM, a hard drive, etc., and external memory 235, which may comprise "accessory" memory such as a SIM card, micro SD card, flash memory, USB Memory Stick, Multi-Media Card, etc. In one embodiment, wireless network access software upgrades may be downloaded Over-the-Air to the mobile endpoint device 220 from the wireless access network 205 via one of base stations 250-251 and executed by the processor 232. In addition, the mobile endpoint device 220 may be configured to maintain user settings in either internal memory 234 or external memory 235 during an OTA wireless network access software upgrade, as will be described in greater detail below in connection with the illustrative methods depicted in FIGS. 3 and 4.

Figure 3:
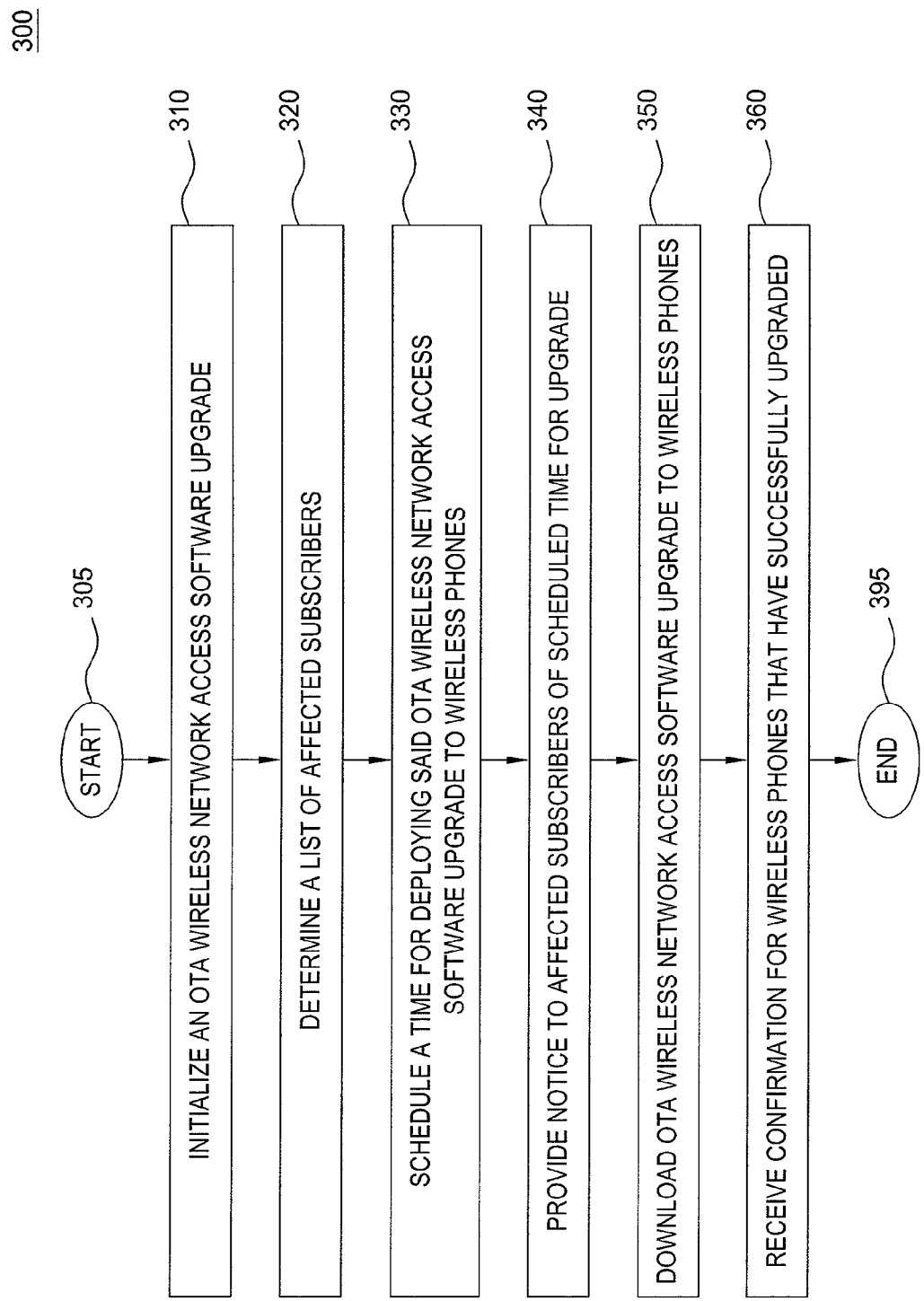
FIG. 3 illustrates a flowchart of a method for deploying an OTA wireless network access software upgrade.

FIG. 3 illustrates a flowchart of a method 300 for deploying an OTA wireless network access software upgrade to mobile endpoint devices. The steps of the method 300 can be performed by any one or more of the network components of the IMS core network 110 or the wireless access network 205. For example, one or more steps of the method 300 can be implemented by the Application Server 112 or S-CSCF 121 in FIG. 1, or the Application server 270, base stations 250-251, or base station controller (BSC) 240 in FIG. 2. For example, one or more steps of the method 300 can be implemented by a general purpose computer (e.g., serving as an application server) having a processor, a memory and input/output devices as illustrated below in FIG. 5.

The method begins in step 305. At step 310, the method initializes an OTA wireless network access software upgrade (hereinafter sometimes referred to as "OTA software upgrade"). For example, in a network such as wireless access network 205, the method may receive and queue a wireless network access software upgrade for OTA deployment to a plurality of mobile endpoint devices 220-222.

In one embodiment, the wireless network access software may comprise software pertaining to the OSI layers 1-3 (i.e., the Physical Layer, the Data Link Layer and the Network Layer). For example, wireless network access software may comprise software that enables: call registration, call setup and call termination, radio bearer or radio resource configuration and reconfiguration, handover to carry the call from one cell to another, reporting radio link measurements from devices to the network, feature activation between the device and the network, such as HSPA+ (High-Speed Packet Access) features or call type, such as AMR (Adaptive Multi-Rate), paging of wireless endpoint devices from the network, PDP (Packet Data Protocol) context activation per APN (Access Point Name) and Quality of Service (QoS) requirements. Exemplary upgrades to the wireless network access software may comprise any software updates pertaining to a change in bandwidth capacity, a codec change or a new codec, a new protocol, or a system information update after a network modification/update.

In one embodiment, the OTA wireless network access software upgrade may be precipitated by the deployment of a new network resource such as a new base station or a new voicemail server. Thus, the network may require that mobile endpoint devices connect to a new voicemail system number after the network deploys the new voicemail server. The wireless network access software may also comprise software that enables network preferences. For example, the network may decide that some wireless endpoint devices should connect to 2G legacy infrastructure first before allowing the devices to use 3G connections. In another embodiment, the wireless network access software pertains to roaming partner management, e.g., the wireless network access software may comprise an allowed roaming network list. The foregoing examples are given for illustrative purposes only. Thus, it should be understood that embodiments are directed to upgrades involving major/core system software pertaining only to wireless network access. Specifically, embodiments of the present disclosure are intended to apply only to software that enables the interworking between a mobile endpoint device and the wireless network pertaining to the Open System Interconnection (OSI) levels 1-3 (i.e., the Physical Layer, the Data Link Layer and the Network Layer). This is in contrast to user application upgrades, such as a new game or new calendar/datebook application, for example.

In step 320, the method 300 determines a list of affected subscribers. For example, in a large wireless communications network with millions of subscribers, the network provider must account for the numerous types of mobile endpoint devices. In one embodiment, the method will identify the affected subscribers for a particular software upgrade. For example, certain types of software upgrade may only affect a subset of the total number of subscribers, e.g., subscribers who own certain types of phones, subscribers who own certain brands of phones, subscribers serviced by a particular set of base stations, subscribers who signed up for service before or after a particular time, and so on. To illustrate, via OTA software upgrades, the wireless network provider may deploy patches or upgrades to only those mobile endpoint devices whose network access software requires changes. Other devices, for example, devices of a later manufacturing date, may already have the necessary functionality and therefore do not need to receive the OTA software upgrade of the wireless network access software. To illustrate another example, in the case where the network deploys a new resource, such as a new voicemail server, the new server may be located in New Jersey and serve only subscribers/users currently within that state. Thus, any OTA wireless network access software upgrades related to connecting to the new voicemail server would only affect subscribers in New Jersey and there would be no need to deploy the OTA software upgrade to subscribers in say California.

In contrast, certain types of software upgrade may affect all subscribers, e.g., features mandated by federal government regulations, or new features that are uniformly available to all subscribers and so on. Accordingly, at step 320 the method 300 compiles a list of only those subscribers/users whose mobile endpoint devices require the OTA wireless network access software upgrade.

At step 330, the method 300 schedules a time for deploying the OTA wireless network access software upgrade. For example, where a very large number of subscribers are affected by the same OTA wireless network access software update, simultaneously deploying the update to all affected subscribers may not be practical and may cause overloading of network resources, thereby hampering network performance. The negative consequences may be especially acute during peak usage times. Thus, the method 300 may schedule the deployment of the OTA wireless network access software upgrade, e.g., during overnight hours when the network is usually less loaded.

In one embodiment, the method may stagger the deployment schedule of the OTA software upgrade. For example, the method may schedule the OTA software upgrade for users in sequential order, e.g., based upon the user identification (UID), the area code of the mobile telephone number, and/or by geographic zones. For example, each base station in the network, such as base stations 250-251, may be capable of supporting 100 simultaneous OTA software upgrades and it is predicted that the OTA software upgrade will require an average of 1 minute to download to each mobile endpoint device. Therefore, the method may schedule successive blocks of 100 subscribers at each base station beginning at 1:00 a.m. and continuing until 1:30 a.m. In this manner, up to 3,000 subscribers per base station may be upgraded during the scheduled time.

At step 340, the method 300 provides a notification (e.g., a text message, a recording, and the like) to the affected subscribers/users of the scheduled time for the OTA wireless network access software upgrade. In this manner, the method provides advance warning to the subscribers to lessen the inconvenience of the temporary disruption to service. In addition, the notification given by the method at step 340 allows a mobile endpoint device receiving the notice to store/cache user settings in preparation for the impending download and installation of the OTA wireless network access software upgrade. As mentioned above, in mobile endpoint devices, wireless network access software changes have the potential of affecting (e.g., changing or deleting) user data or settings during the upgrade/installation process, such as data or settings that were previously configured or entered by the user.

In one embodiment, the mobile endpoint device stores the user settings in an object-oriented list, with objects segregated and arranged by application which can be saved in a memory connected to or integral with the mobile endpoint device. For example, mobile endpoint device 220 in FIG. 2 may store the object-oriented list in the internal memory 234 or the external memory 235, depending upon the capacity of each memory type, or user or network preferences. In one embodiment, the user settings may comprise any one or more of a user's email settings, contact list, ringtones, voicemail or call forwarding preferences, voicemail or text message retention preferences, BLUETOOTH configurations, and/or passwords. In one embodiment, user settings are grouped by application, each application comprising an object in an object oriented list, with each object containing the user settings for that application. For example, the user's BLUETOOTH settings will all be stored in one object, the user's call forwarding settings will all be stored in another object in the objected-oriented list, etc. Storing the user settings in this manner enables an efficient restoration of the user settings after the installation of the OTA wireless network access software upgrade.

In one embodiment, the notification provided by the method 300 at step 340 may comprise a text or voice message sent to the affected mobile endpoint devices. For example, the notification may comprise a voice announcement that is played to the user during a voice call setup prior to connecting a call. In other words, when a user attempts to call another user via his or her mobile endpoint device, the network will present a notification of the pending software upgrade before the call is connected. In this manner, the method increases the likelihood that the user will be informed of the pending software upgrade.

In step 350, the method 300 downloads the wireless network access software upgrade via OTA (wirelessly) to the affected mobile endpoint devices according to the schedule determined by the method in step 330. In one embodiment, the mobile endpoint devices are configured to automatically install the downloaded wireless network access software upgrades. Thus, the user has no ability to disrupt the installation, and the OTA software upgrade will be performed regardless of whether the user desires the upgrade or not. This is necessary to ensure proper functioning of the mobile endpoint device with the wireless access network. For example, if a wireless network access software upgrade pertains to the deployment of one or more new Authentication, Authorization and Accounting (AAA) procedures, the network may not wish to leave the upgrade to the discretion of a user. For example, it may afford an opportunity for the user to use a new service without proper accounting of charges for accessing the new service. In another example, if the upgrade is not properly installed on certain mobile endpoint devices, the network may have to deal with numerous error messages as mobile endpoint devices without the proper upgrades may fail in accessing certain services, thereby leading to subscriber dissatisfaction.

In one alternate embodiment the method 300 may prompt a user to respond, e.g., via a text message or simply selecting an option presented to the user, with a designated time to download and install the software upgrade. For example, the method may give the user a choice of any time within the next 24 hours to schedule the OTA software upgrade. The user may then send a text message to a designated number simply providing his or her preferred time, or pressing a button correlating to a selection when the notification is presented to the user. If the user does not respond, responds incompletely or incorrectly, or attempts to choose a time outside the designated window (e.g., outside the 24 hours being offered), the method 300 may schedule a default time for the OTA software upgrade.

Following installation of the wireless network access software upgrade, a mobile endpoint device may then restore the saved user settings. For example, the wireless network access software upgrade may include instructions to the mobile endpoint devices, such as mobile endpoint device 220, to retrieve user settings stored in memory 233, when the installation of the software upgrade is otherwise complete. Alternatively, a mobile endpoint device may be preconfigured to restore user settings stored in a memory upon completion of any OTA software upgrade. In one embodiment, a user may be prompted as to whether he or she would like to restore the user settings prior to the mobile endpoint device doing so. Thus, some users may actually decide to start with a "clean" device and discard all or a portion of the prior user settings.

At step 360 the method 300 receives confirmation from those mobile endpoint devices that have successfully installed the upgrade and restored user settings. In one embodiment, the software upgrade includes instructions to the mobile endpoint devices to transmit a confirmation of a successful installation of the software upgrade and restoration of user settings. In this manner, the method 300 may determine whether it is necessary to redeploy the wireless network access software upgrade to any mobile endpoint devices that have not confirmed successful installation and restoration of user settings. This approach allows the network to monitor the progress of the deployment of the OTA software upgrade across a multitude of affected mobile endpoint devices. The method ends at step 395.

Figure 4:
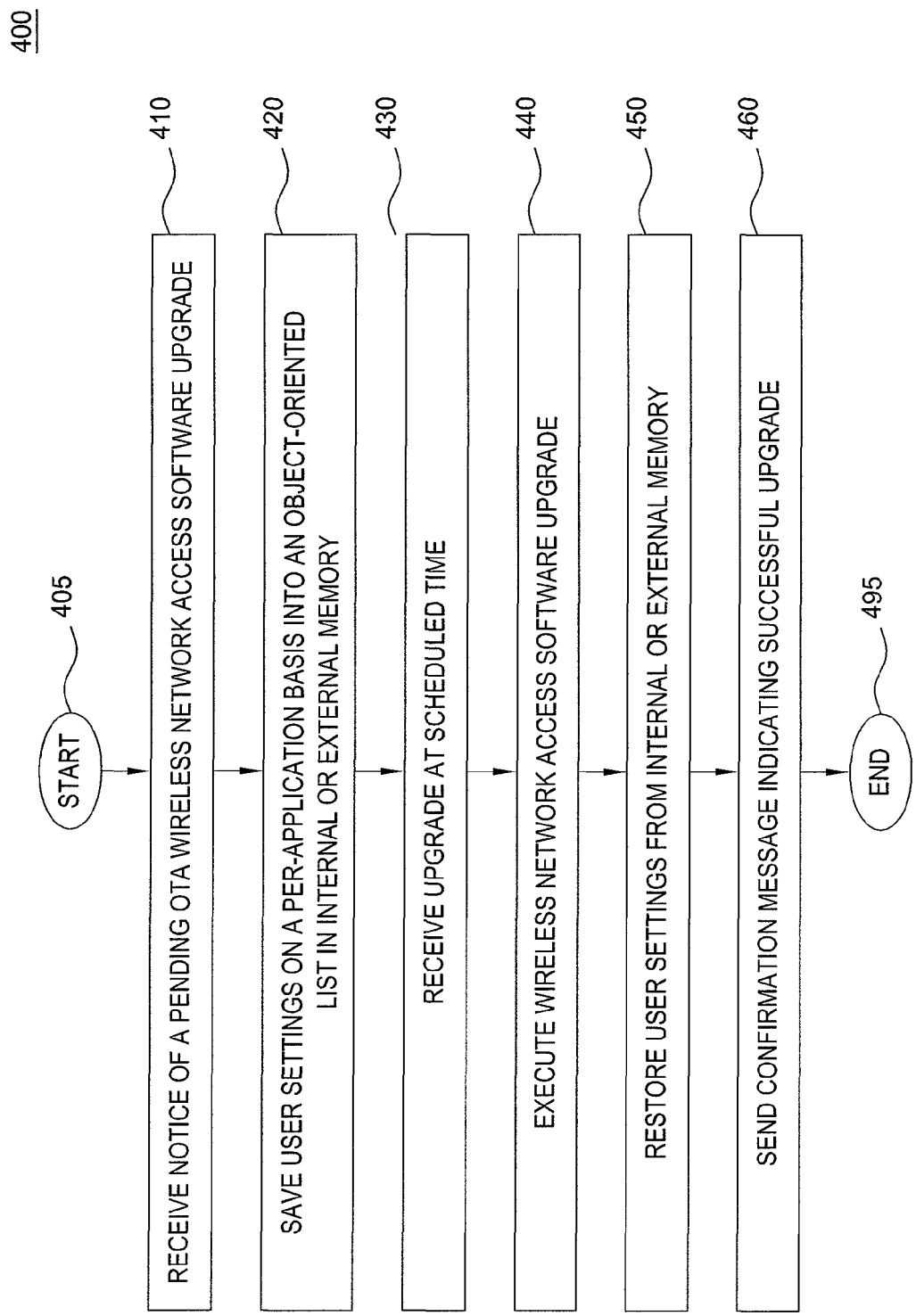
FIG. 4 illustrates a flowchart of a method for executing an OTA wireless network access software upgrade.

FIG. 4 illustrates a flowchart of a method 400 for executing an OTA wireless network access software upgrade. In one embodiment, one or more steps of the method 400 are performed at a mobile endpoint device, such as one of the mobile endpoint devices 220-222. The method 400 begins in step 405.

At step 410, the method receives a notification of a pending OTA wireless network access software upgrade. For example, the method may receive a notice via a base station of the scheduled time for the OTA wireless network access software upgrade. In one embodiment, the notice includes information describing certain details of the upgrade. In this manner, the method provides advance warning to subscribers/users to lessen the inconvenience of any temporary disruption to service.

In one embodiment, the notification received at step 410 may comprise a text or voice message. In one embodiment, the notice is provided to a user via a voice announcement that is played to the user during a voice call setup prior to connecting the call. In one embodiment, the notification indicates a scheduled time for the download of the wireless network access software upgrade. In another embodiment, the notification may request that a user respond, e.g., via text message or a selection by pressing a button on a keypad or screen, with a designated time to download and install the upgrade. For example, the notice may give the user a choice of any time within the next 24 hours to schedule the OTA upgrade. The user may send a text message to a designated number simply providing his or her preferred time or simply picking a selection presented by the notification.

At step 420, having received advance notice of a pending OTA wireless network access software upgrade, the method 400 begins storing/caching user settings in preparation for the impending wireless network access software upgrade download and installation. In one embodiment, the method stores user settings in an object-oriented list with objects segregated and arranged by application, which can be saved in a memory connected to or integral with a mobile endpoint device. For example, the method 400 may store the object oriented list in the internal memory 234 or external memory 235 of a wireless endpoint device 220, depending upon the capacity of each memory type, or user or network preferences.

In step 430, the method 400 receives an OTA wireless network access software upgrade. For example, the method may receive the OTA software upgrade from a wireless network 205 via base station 250.

At step 440, the method 400 executes/installs the wireless network access software upgrade. For example, the wireless network access software upgrade is loaded into memory 233 (e.g., RAM) and executed by the processor 232 at a mobile endpoint device. In some instances, the installation of the wireless network access software upgrade may require a system restart, which can be triggered automatically.

At step 450, the method 400 restores user settings. For example, upon restarting after successful installation of the wireless network access software upgrade at step 440, the method may retrieve stored user settings from memory 233 and restore the user settings to the proper locations for use by the respective applications to which the user settings pertain. As described above, in one embodiment the user settings are stored in an object-oriented list, with each object storing only user settings corresponding to one application type. Because the objected-oriented list is configured in this fashion, the user settings may be efficiently restored.

At step 460, the method 400 sends a confirmation message indicating a successful upgrade. For example, the method 400 may send a confirmation message indicating a successful installation of the wireless network access software upgrade and successful restoration of user settings to the wireless network 205. The confirmation may be used by an operator of the wireless network to determine whether it is necessary to redeploy the OTA wireless network access software upgrade to any mobile endpoint devices that have not confirmed successful installation of the software upgrade and restoration of user settings. The method ends at step 495.

Figure 5:
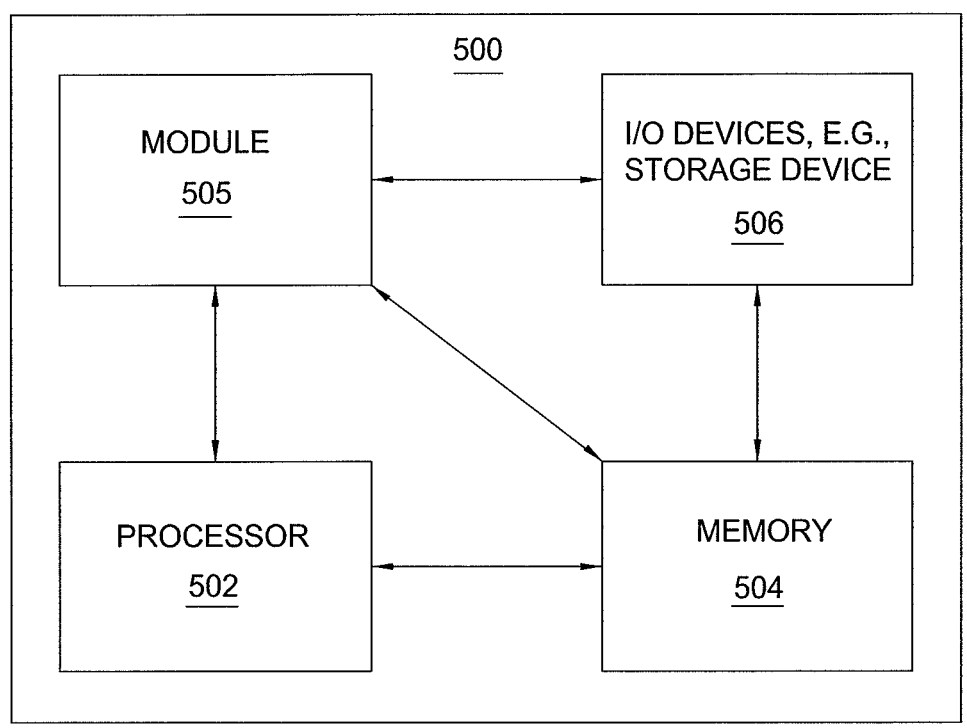
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for deploying or executing an OTA wireless network access software upgrade, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 505 for deploying or executing an OTA wireless network access software upgrade can be loaded into memory 504 and executed by processor 502 to implement the functions as discussed above. As such, the present module 505 for deploying or executing an OTA wireless network access software upgrade (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for performing a software upgrade, comprising:
    determining, by an application server comprising a processor, a plurality of mobile endpoint devices affected by a wireless network access software upgrade;
    scheduling, by the application server, a deployment of the wireless network access software upgrade to the plurality of mobile endpoint devices in accordance with a schedule;
    transmitting, by the application server, a notification of the deployment of the wireless network access software upgrade to the plurality of mobile endpoint devices, wherein each of the plurality of mobile endpoint devices stores user settings in an external memory of each of the plurality of mobile endpoint devices responsive to the notification, wherein the user settings comprise a voice-mail preference setting; and
    downloading, by the application server, the wireless network access software upgrade wirelessly to the plurality of mobile endpoint devices for installation by the plurality of mobile endpoint devices, wherein the wireless network access software upgrade is for causing each of the plurality of mobile endpoint devices to install the wireless network access software upgrade and to restore the user settings from the external memory of each of the plurality of mobile endpoint devices.

2. The method of claim 1, further comprising:
    receiving a confirmation of a successful installation of the wireless network access software upgrade and a successful restoration of the user settings from a mobile endpoint device of the plurality of mobile endpoint devices.

3. The method of claim 1, wherein the wireless network access software upgrade comprises software that enables intercommunication between a wireless network and the plurality of mobile endpoint devices at a network layer.

4. The method of claim 1, wherein the wireless network access software upgrade comprises software that relates to a radio bearer configuration.

5. The method of claim 1, wherein the user settings are stored in an objected-oriented list having a plurality of objects, where each object is associated with an application.

6. The method of claim 1, wherein each of the plurality of mobile endpoint devices is a mobile phone.

7. The method of claim 1, wherein the wireless network access software upgrade comprises software that enables intercommunication between a wireless network and the plurality of mobile endpoint devices at a data link layer.

8. The method of claim 1, wherein the wireless network access software upgrade comprises software that enables intercommunication between a wireless network and the plurality of mobile endpoint devices at a physical layer.

9. The method of claim 1, wherein the wireless network access software upgrade comprises software that relates to a radio resource configuration.

10. The method of claim 1, wherein the wireless network access software upgrade comprises software that relates to a handover of a call from one cell to another cell.

11. The method of claim 1, wherein the wireless network access software upgrade comprises software that relates to a reporting of a radio link measurement.

12. The method of claim 1, wherein the wireless network access software upgrade comprises software that relates to a change in bandwidth capacity.

13. The method of claim 1, wherein the user settings comprise a call forwarding preference setting.

14. A tangible computer-readable storage medium storing a plurality of instructions which, when executed by a processor, cause the processor to perform operations for performing a software upgrade, the operations comprising:
    determining a plurality of mobile endpoint devices affected by a wireless network access software upgrade;
    scheduling deployment of the wireless network access software upgrade to the plurality of mobile endpoint devices in accordance with a schedule;
    transmitting a notification of the deployment of the wireless network access software upgrade to the plurality of mobile endpoint devices, wherein each of the plurality of mobile endpoint devices stores user settings in an external memory of each of the plurality of mobile endpoint devices responsive to the notification, wherein the user settings comprise a voicemail preference setting; and
    downloading the wireless network access software upgrade wirelessly to the plurality of mobile endpoint devices for installation by the plurality of mobile endpoint devices, wherein the wireless network access software upgrade is for causing each of the plurality of mobile endpoint devices to install the wireless network access software upgrade and to restore the user settings from the external memory of each of the plurality of mobile endpoint devices.

15. The tangible computer-readable storage medium of claim 14, wherein the operations further comprise:
    receiving a confirmation of a successful installation of the wireless network access software upgrade and a successful restoration of the user settings from a mobile endpoint device of the plurality of mobile endpoint devices.

16. The tangible computer-readable storage medium of claim 14, wherein the user settings are stored in an objected-oriented list having a plurality of objects, where each object is associated with an application.

17. A method for performing a software upgrade, comprising:
    receiving, by a mobile endpoint device, a notification of a deployment of a wireless network access software upgrade in accordance with a schedule;
    storing, by the mobile endpoint device, user settings in an external memory of the mobile endpoint device, wherein the user settings comprise a voicemail preference setting;
    receiving, wirelessly by the mobile endpoint device, the wireless network access software upgrade;
    installing, by the mobile endpoint device, the wireless network access software upgrade; and
    restoring, by the mobile endpoint device, from the external memory the user settings after installing the wireless network access software upgrade.

18. The method of claim 17, further comprising:
    transmitting a confirmation of a successful installation of the wireless network access software upgrade and a successful restoration of the user settings to a wireless access network.

19. The method of claim 17, wherein the user settings are stored in an objected-oriented list having a plurality of objects, where each object is associated with an application.

* * * * *